United States Patent [19]
Wittry

[11] Patent Number: 5,685,269
[45] Date of Patent: Nov. 11, 1997

[54] HIGH SPEED ROTARY ENGINE AND IGNITION SYSTEM

[76] Inventor: David B. Wittry, 1036 S. Madison Ave., Pasadena, Calif. 91106

[21] Appl. No.: 613,545

[22] Filed: Mar. 11, 1996

[51] Int. Cl.[6] .................................................... F02B 53/00
[52] U.S. Cl. ........................ 123/245; 123/210; 418/37
[58] Field of Search ................................ 123/210, 245; 418/36, 37

[56] References Cited

U.S. PATENT DOCUMENTS

| | | | |
|---|---|---|---|
| 2,061,131 | 11/1936 | Bancroft | 418/37 |
| 3,922,118 | 11/1975 | Bancroft | 418/37 |
| 5,112,204 | 5/1992 | Parsons | 418/36 |
| 5,433,179 | 7/1995 | Wittry | 123/245 |

Primary Examiner—Michael Koczo

[57] ABSTRACT

A rotary engine in which two rotors having interleaving radial vanes move with cyclic rotary motion superposed on uniform rotary motion inside a cylindrical cavity in a cooled engine housing. The rotor vanes divide the cylindrical cavity into four compartments in which intake, compression, explosion and exhaustion occur. The rotor motion is obtained by a gear and linkage system made up of an internal gear which rolls on a fixed external gear. The internal gear, having a pitch diameter of 3/2 the pitch diameter of the external gear, is contained in a moving housing that has crank pins that move in epicycloidal curves. Each crank pin is coupled to a crank on one of the rotors. Ignition timing is done by sensing the motion of the internal gear housing using magnetic means or optical means.

20 Claims, 4 Drawing Sheets

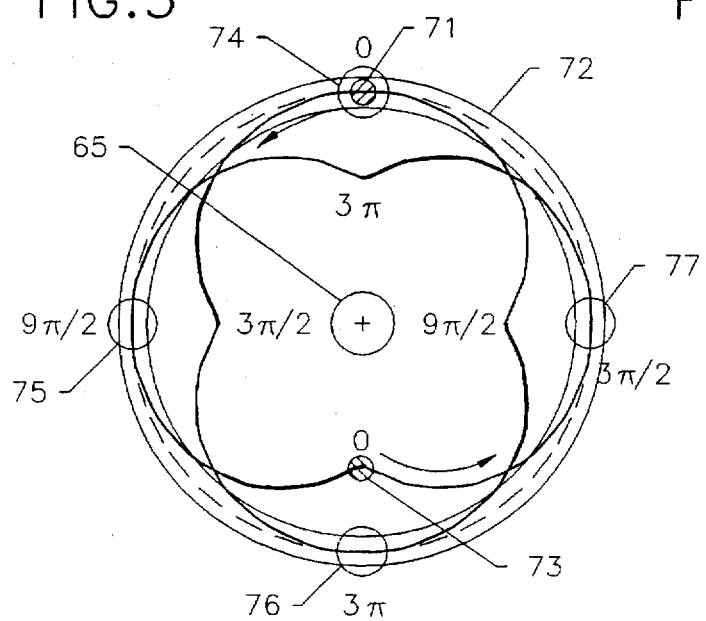
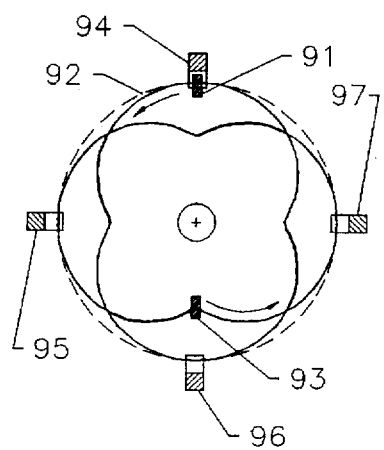
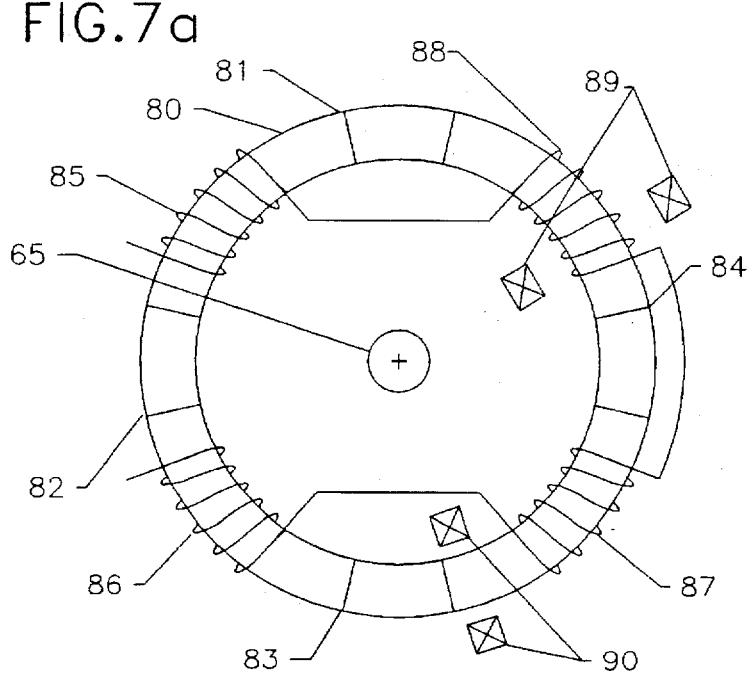
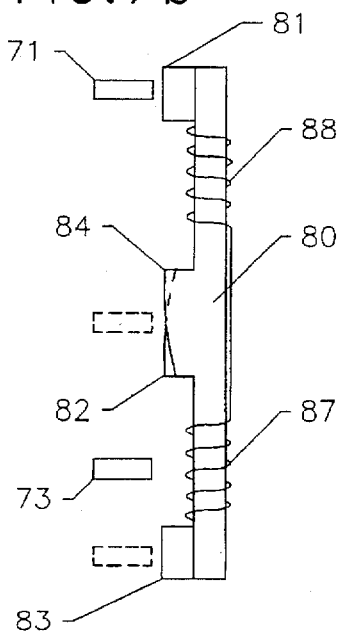

HIGH SPEED ROTARY ENGINE AND IGNITION SYSTEM

BACKGROUND

1. Field of the Invention

This invention relates to internal combustion rotary engines having rotors that move inside a cylindrical housing with cyclic rotary motion superposed on uniform rotary motion.

2. Prior Art

Rotary internal combustion engines employing rotors that have cyclic rotary motion superposed on uniform rotary motion are well known. These engines have been called "scissors action engines", "cat-and-mouse engines", or "reciprocating vane engines". Examples of such engines are given in U.S. Pat. No. 3,592,571 by Drury and U.S. Pat. No. 5,433,179 by Wittry. In these engines two rotors containing radially directed vanes are interdigitated to form four compartments in which intake, compression, expansion and exhaustion occur. The reciprocating motion is obtained by the use of a planetary gear system with cranks and connecting rods.

The planet gears have pitch diameter that is half of the pitch diameter of the sun gear and the output shaft is connected to the planet gear cage. Proper choice of crank and connecting rod lengths results in each of the rotors alternately coming to a dwell position during their rotation. This allows the rotors to function not only as the pistons do in an ordinary internal combustion engine but also as valves controlling the intake and exhaust of gas from the combustion chamber. While the necessary phase shift of one rotor relative to the other rotor could be obtained with only one planet gear, because of space constraints typically at least two planet gears are required.

The existing rotary engines of the type described have two principal disadvantages. This first disadvantage is that the maximum speed of the output shaft is limited by the 2:1 gear reduction of the planetary gear system. This gear reduction, while useful in some applications, may be disadvantageous in other applications in which small single cylinder two stroke cycle engines are currently used, for example, chain saws, weed trimmers, and lawn mowers. The second disadvantage is that many bearings and rotating shafts are required—leading to higher cost and to greater friction losses.

The present invention overcomes these disadvantages while also providing the same advantages of the basic rotary engine over reciprocating-piston engines.

OBJECTS AND ADVANTAGES OF THE PRESENT INVENTION

The object of this invention is to provide an engine which has the following advantages over similar rotary engines: a) higher output shaft speeds, b) simpler gear system, and c) possibility of operation with glow ignition or spark ignition with a coil or magneto using a minimum of additional parts. In addition, it can provide important advantages over conventional piston engines, namely: a) larger intake and exhaust ports, b) no requirement for separate valves and camshaft, c) more uniform torque, d) higher power-to-weight ratio, e) less vibration, f) lower exhaust noise, g) lower exhaust temperature, h) higher overall efficiency, i) high efficiency over a wider range of speeds, j) optimum efficiency with various fuels, and k) higher efficiency over a wider range of atmospheric conditions.

DESCRIPTION OF THE FIGURES

FIG. 5 is a schematic drawing of one version of ignition system for use with the new transmission gear drive system.

FIG. 6 is a schematic drawing of another version of ignition system for use with the new transmission gear drive system.

FIG. 7a and FIG. 7b are two views of one form of electromagnetic pickup for the ignition system of the new rotary engine.

DETAILED DESCRIPTION OF THE INVENTION

Figure 1:
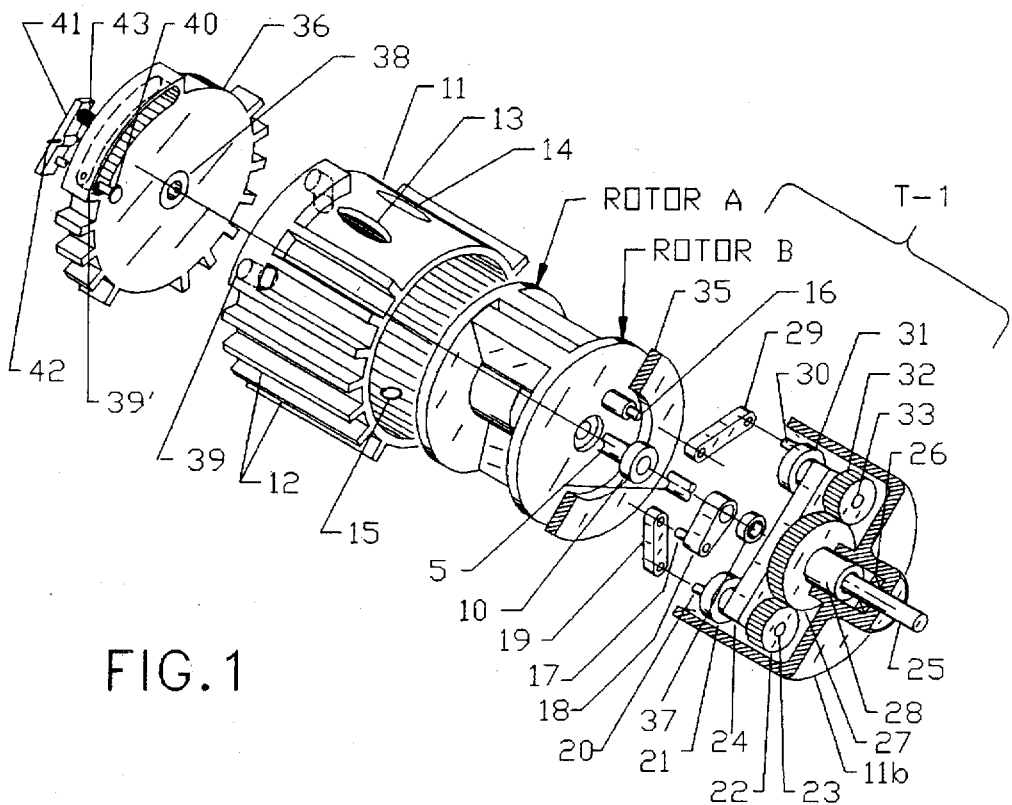
FIG. 1 is a drawing of a rotary engine with planetary gear transmission and variable compression ratio as described in the prior art.

The present invention can be best understood after a review of the basic rotary engine shown in FIG. 1. This is an engine of the so-called cat-and-mouse type which utilizes two rotors connected to a planetary gear drive as described in U.S. Pat. No. 5,433,179. In this engine, two nested rotors each of which contain two diametrically opposed vanes and circular end plates are contained inside a cylindrical housing 11 containing cooling fins 12. Housing 11 contains an intake port 13, an exhaust port 14, and an ignition or fuel injection port 15 located opposite the intake and exit ports.

The connection of the rotor assembly to the rotor drive assembly is made by cranks and connecting rods. Rotor A is connected by shaft 5, which passes through rotor B, to crank arm 18 containing crank pin 17. Crank pin 17 drives the connecting rod 19 which turns crank disk 21 by crank pin 20. Crank disk 21 is connected to planet gear 22 by shaft 23 which is rotatably contained in planet cage 24. Planet cage 24 is connected to output shaft 25 which rotates in bearing 26 contained in the housing. Planet gear 22 rolls on sun gear 27 which has a hub 28 fixed in the housing.

In a similar manner, rotor B has a crank pin 16 eccentrically located relative to the rotor axis; this pin is coupled by a connecting rod 29 to pin 30 on crank disk 31. Crank disk 31 is connected to a second planet gear 32 by shaft 33 which is rotatably contained in planet cage 24. Planet gear 32, like planet gear 22, rolls on the teeth of sun gear 27.

Operation of the engine is as follows: as the output shaft turns, the planet cage 24 rotates about the sun gear 27. As the planet gears 22 and 32 roll on the sun gear 27, the connecting rods 19 and 29 impart a cyclic angular motion superposed on a uniform rotary motion to the rotors A and B, respectively. Thus, as the rotors turn about their own axis which is parallel to the output shaft, the vanes on rotor A and rotor B, move toward and away from each other. The planet gears 22 and 32 have a pitch diameter which is half the pitch diameter of the sun gear 27 so that in one revolution of the output shaft, the vanes on rotor A and the vanes on rotor B move toward and away from each other twice. Furthermore, the position where they are closest to each other and farthest from each other remains fixed relative to the cylindrical housing 11.

By suitable choice of the length of the crank arms connected to the rotors, the length of the crank arms corresponding to the crank disks, and the length of the connecting rods 19 and 29, and by having a correct relation between the phase angles of the two crank disks 21 and 31, it is possible to obtain motion of rotor A relative to rotor B so that rotor A is nearly stationary while rotor B is moving and then rotor B slows down and stops (or moves slowly) while rotor A speeds up. This is the basis for the so-called cat-and-mouse motion.

FIG. 1 also shows that the rotor assembly is isolated from the gear housing by a partial radial wall 35 and is isolated from the external environment by an exterior radial wall 36. These walls provide conduction of heat away from the rotors but are not required to constrain the axial movement of one rotor relative to the other due to the thrust bearing 10. Radial forces on the rotors are absorbed by a bearing 37 between shaft 5 and planet cage 24, and by a bearing 38 located in the exterior axial wall 36.

Reference numerals 39 through 44 relating to portions of FIG. 1 near the exterior axial wall are used to provide vented compression that makes the compression ratio of the engine adjustable, which was described in the inventor's U.S. Pat. No. 5,433,179 and is incorporated by reference. These features are not described further here but it is apparent that adjustable compression ratio could be employed in conjunction with the subject invention.

Figure 2:
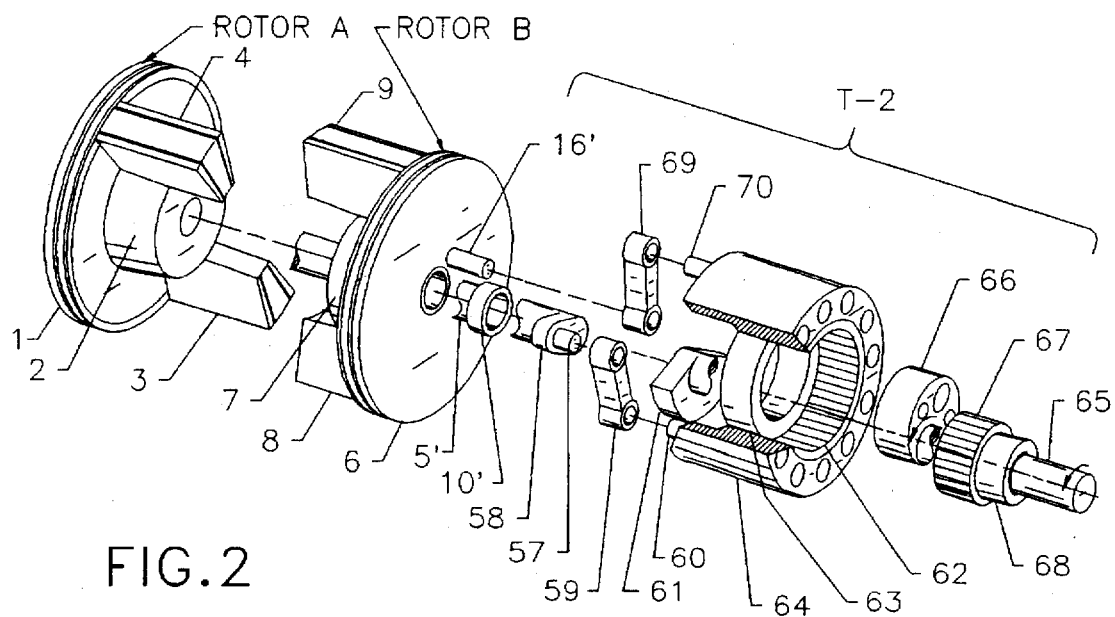
FIG. 2 is a drawing of the rotary engine with a new gear transmission system which is included in the subject invention.

The essential features of the subject invention are shown in FIG. 2. In this figure, two rotors similar to those of FIG. 1 are employed. Rotor A consists of a circular end plate 1 having a hub 2 and diametrically opposed radial vanes 3 and 4. Similarly, rotor B consists of a circular end plate 6 having a hub 7 and diametrically opposed radial vanes 8 and 9. This rotor configuration is similar to the rotors shown in FIG. 1 but it is apparent that other rotor configurations could be used such as those indicated in the inventor's U.S. patent application Ser. No. 08/442,486 filed Jul. 15, 1995 now U.S. Pat. No. 5,622,149, and incorporated by reference. Rotor A has an axial shaft 5' rigidly attached to it. When the two rotors are interdigitated, the shaft 5' passes through an axial hole of appropriate size in Rotor B so that rotor B is free to rotate about it. The two rotors seal against their mating surfaces. In small engines, the parts of the rotor that slide on the mating rotor can be lapped together to provide a close fit. In larger engines sealing strips as are used in the Wankel engine may be employed. A thrust bearing 10' located on shaft 5' constrains rotor B relative to rotor A and prevents the two rotors from moving apart.

The subject invention shown in FIG. 2 and the prior art shown in FIG. 1 differ with respect to the gear transmission system employed. The gear transmission system denoted by T-1 in FIG. 1 is replaced by the gear transmission system T-2 in FIG. 2. The essential parts of gear transmission system T-2 are described as follows.

Rotor A is connected by shaft 5', which passes through rotor B, to crank arm 58 containing crank pin 57. Crank pin 57 drives the connecting rod 59 which is coupled to crank pin 60. Crank pin 60 is connected to a moving housing 64 containing an internal gear 62 and a bearing 63 for the eccentric 66 mounted on output shaft 65. The moving housing 64, which is preferably made of a light weight alloy and may contain lightening holes, is balanced about the axis of the output shaft 65 by counterweight 61. The internal gear 62 rolls on a gear 67 which has a hub 68 fixed in the housing (not shown). Similar to the crank on rotor A, rotor B has a crank pin 16' eccentrically located relative to the rotor axis; this pin is coupled by a connecting rod 69 to pin 70 attached to the moveable housing 64.

Figure 3:
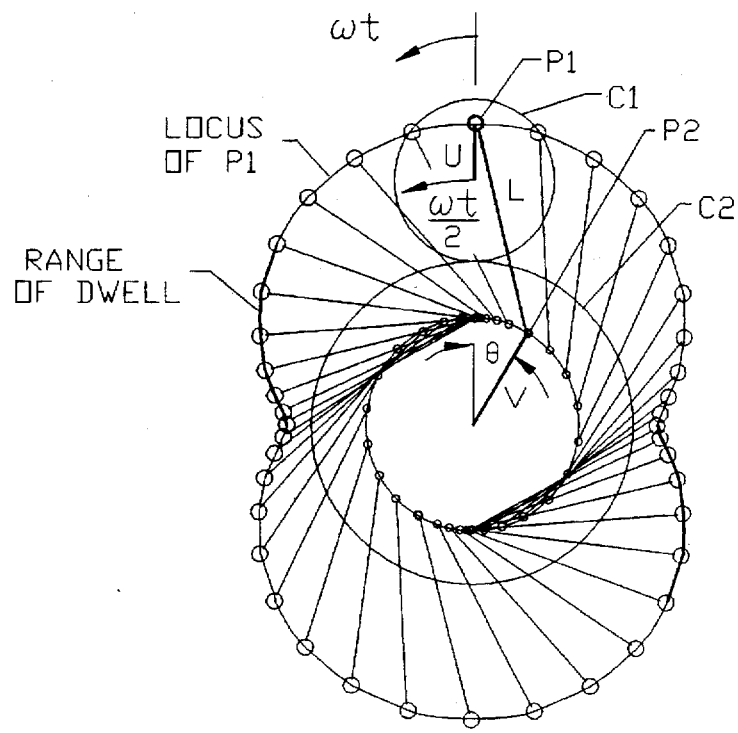
FIG. 3 is a schematic drawing showing the kinematics of a typical planetary gear drive system.
Figure 4:
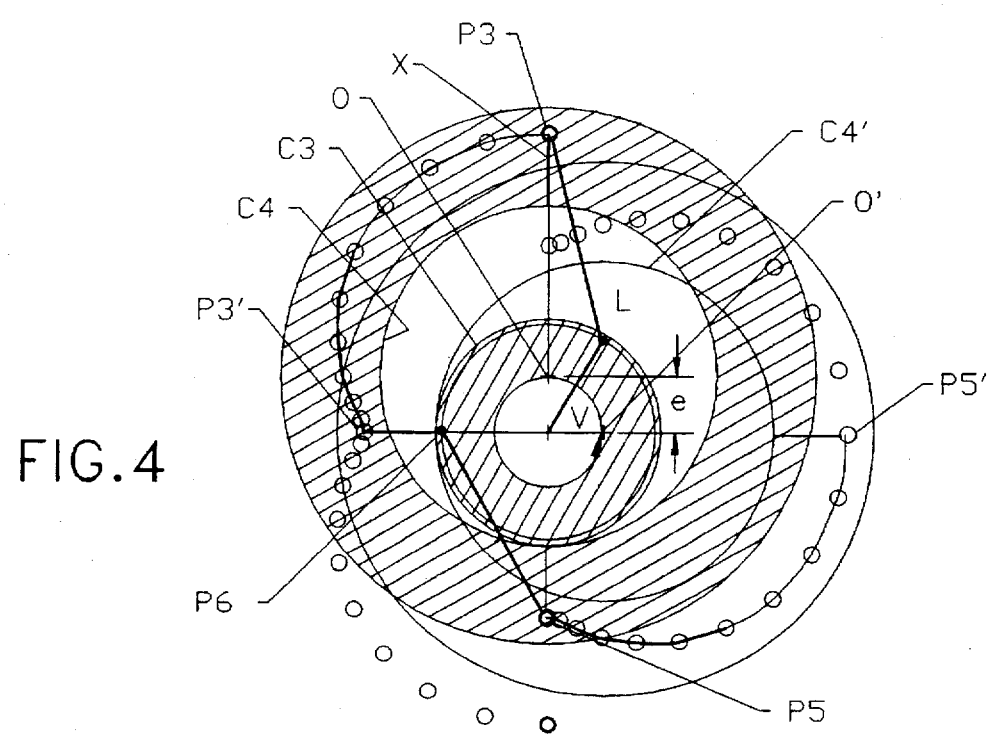
FIG. 4 is a schematic drawing showing the kinematics of the new transmission gear drive system.

The motion of the rotors in the subject invention can be understood by reference to FIGS. 3 and 4. FIG. 3 shows the kinematics of the motion of transmission gear system T-1. As described in U.S. Pat. No. 5,433,179, as the planet gear C1 rolls on the sun gear C2 the path of pin 30 of FIG. 1 is the epicycloid traced by point P1 in FIG. 3. A crank of length U is connected to the planet gear shaft and a crank of length V is connected to the rotor. The successive positions of the connecting rod L during one revolution of the planet gear about the sun gear are shown at intervals of π/20. When a portion of the epicycloidal curve can be approximated by a circular arc, a dwell is obtained in the rotor position θ if the rotor crank length V has a value such that the center of curvature of the circular arc lies on the circle described by the pin P2 on the rotor crank.

The subject invention is based on the described properties of the epicycloidal curve and the fact that an epicycloid can also be formed by the motion of a point fixed relative to an internal gear which rolls on a fixed external gear C3. This is shown in FIG. 4. In this figure, as the internal gear C4 rolls on the fixed external gear C3, the point P3 moves in an epicycloidal path. The ratio of the pitch diameter of the internal gear to the pitch diameter of the first external gear must be 3/2 in order to form a epicycloid that is a closed path. The point P5 also moves in a epicycloidal path but this cycloidal path is shifted from the path of the epicycloid generated by point P3. When the center of the internal gear rotates 270 degrees about the center of the fixed gear so that the new position of the external gear is C4', the point P3 moves to P3', the point P5 moves to P5', and the center of the internal gear moves from O to O'.

If the crank lengths U and V in FIG. 3 are known, it is a simple matter to find the relationship between the offset of the point P3 and P5 from pitch diameter of the internal gear so that the epicycloidal path generated by the gears shown in FIG. 4 will be the same shape as the one in FIG. 3. Let us call this offset distance x and let e be the eccentricity as shown in FIG. 4. Assume that $R_3$ is the pitch radius of the gear C3 and $R_4$ is the pitch radius of the gear C4 in FIG. 4. Also, assume that $R_2$ is the pitch radius of the sun gear C2 and $R_1$ is the pitch radius of the planet gear C1 as shown in FIG. 3. From the geometrical constraints, we have the following equations:

$$R_2=2R_1, R_4=3R_3/2, \text{ and } e=R_3/2$$

Two equations are obtained from the requirement that the epicycloidal path of FIG. 4 match the epicycloidal path of FIG. 3. The first is obtained by requiring that P1 and P3 coincide when they are at the largest distance from the axis and is as follows:

$$R_4+e+X=R_1+R_2+U \quad (1)$$

A second equation is obtained by requiring that P1 and P3 coincide when they are at the smallest distance from the axis and is as follows:

$$R_3+X=R_1+R_2-U \quad (2)$$

From these equations we obtain:

$$e=U$$

$$X=3R_1-3U \quad (3)$$

When the cycloid formed by the motion of point P3 is the same as the epicycloid formed by the motion of point P1, it is apparent that the motion of one of the rotors for transmission T-2 will be the same as the motion of the corresponding rotor for transmission T-1. Moreover, the point P5 moves on an epicycloid that is shifted from the epicycloid generated by P3 by a 90 degree rotation. Thus, the motion of the second rotor with the desired phase shift from the first rotor is also obtained. Thus, the number of gears, shafts, and bearings is less for transmission T-2 than it is for transmission T-1. Also, the output shaft for transmission T-2 will move at three times the speed of the output shaft of transmission T-1 because the center of the internal gear will make 3 revolutions about the axis of the output shaft as the point P3 travels once around the epicycloidal path.

SPARK IGNITION SYSTEM FOR THE NEW ROTARY ENGINE

It has been shown in the inventor's U.S. patent application Ser. No. 08/504,241 filed Jul. 19, 1995 now US. Pat. No. 5,537,973, and incorporated by reference, that ignition by means of glow plugs can be used in the basic rotary engine shown in FIG. 1. Hence, it is apparent that glow plugs could be used in a similar manner for the new rotary engine described herein.

However, if spark ignition is used, the timing of the ignition must take into account the fact that there must be four explosions for three revolutions of the output shaft. This could be done by means of a timing shaft that is geared to the output shaft in a manner similar to the distributor shaft of a multicylinder four stroke cycle piston engine. But, in order to reduce the parts required for small rotary engines of the subject invention, a new type of ignition system is desirable.

The new ignition system uses the motion of the housing of the internal gear for timing and thus avoids the need for separate timing gears. This is shown in FIGS. 5–9. FIG. 5 and FIGS. 7a and 7b show an ignition timing system based on the use of moving permanent magnets. It is apparent that other methods of detecting motion or position could also be used such as variable reluctance, or interruption of the path of a light beam which is shown in FIG. 6.

The ignition system may be understood by reference to FIGS. 5, 6 7a, and 7b. FIG. 5 shows the motion of two permanent magnets 71 and 73, respectively, which are attached to the internal gear housing 64. Like the pins P3 and P4, the path of each of these magnets is a cycloid. Velocity-sensitive position detectors are located at fixed positions 74, 75, 76 and 77 contained on a mounting ring 72 and lying on a circle whose center coincides with the center of the output shaft. As the magnets travel about the cycloid once, magnet 71 passes sensors 74 and 76, and magnet 73 passes sensors 75 and 77. The angular shaft position in radians as each magnet passes the sensors is shown next to the sensors in FIG. 5. In one form of the ignition system using electromagnetic sensors, the magnets 71 and 73 would ideally have opposite polarity facing the sensors. In other cases, e.g. when Hall sensors are used, the magnets could have the same polarity facing the sensors.

An alternative form of ignition timing system is shown in FIG. 6. This figure shows opto-interrupter sensors 94, 95, 96 and 97 located on a ring 92. The path of light within the opto-interrupters is blocked by baffles 91 and 93 contained on the internal gear housing.

In the ignition system using electromagnetic sensors, the sensors 74, 75, 76, and 77 correspond to pole pieces of electromagnets as shown for example by 81, 82, 83, and 84 in FIGS. 7a and 7b. These figures show axial and transverse views of an integrated electromagnetic pickup system. FIG. 7a shows the electromagnets magnetically coupled by a circular magnetic yoke 80 whole center coincides with the axis of the engine shaft 65. In the arrangement shown in FIG. 7a, the coils 85, 86, 87 and 88 of the electromagnetic pickup are wound on the yoke 80 with a direction such that the voltages produced in the coils produced when the magnets 71 and 72 pass the pole pieces 81, 82, 83, and 84 are additive. While separate coils and electromagnets could also be used, the integrated pickup assembly shown in FIGS. 7a and 7b has the advantage of compact size and efficient coupling of the changing magnetic flux with the coils. Moreover, adjustment of the ignition timing can be obtained by rotating the complete electromagnetic pickup assembly about the axis of the engine shaft.

The pole pieces 81, 82, 83, and 84 have faces that are suitably shaped so that the voltage induced in the coils 85, 86, 87, and 88 has a waveform enabling the sensors 74, 75, 76, and 77 to perform as velocity dependent sensors. This is shown by the side view of the pole pieces 82 and 84 shown in FIG. 7b. The use of velocity dependent sensors facilitates obtaining an advance in the ignition with increasing engine speed in a manner shown in FIG. 8.

Figure 8:
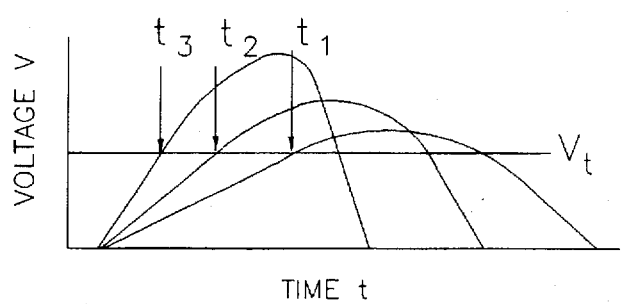
FIG. 8 is a graph showing the voltage vs time for the electromagnetic pickup of the ignition system.

FIG. 8 shows a typical voltage waveforms for different engine speeds. Because of the electromagnetic pickup, the voltage increases with increasing velocity since the voltage V induced in the coils is proportional to $L(dB/dt)$ where L is the inductance, B is the magnetic flux and t is the time. A predetermined threshold voltage called $V_t$ in FIG. 8 controls the time at which the ignition spark occurs through the use of an electronic control module such as the one shown in FIG. 9a.

Figure 9A:
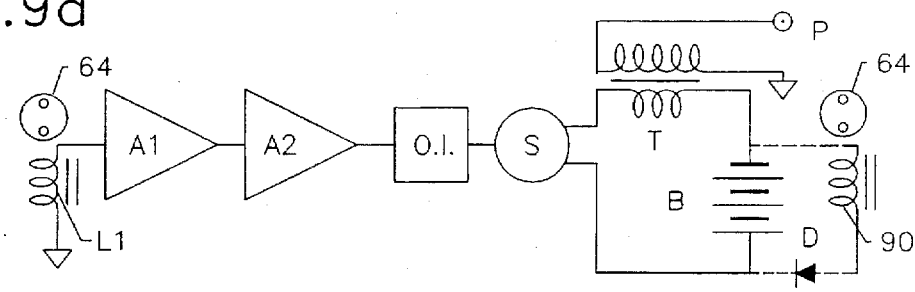
FIG. 9a, FIG. 9b, and FIG. 9c are circuit diagrams of different versions of spark ignition for the new rotary engine.

In the electronic ignition control module shown in FIG. 9a, an amplifier A1 amplifies and conditions the voltage from the coil assembly L1. A comparator A2 senses when the voltage reaches the threshold voltage $V_t$. An opto-isolator O.I. couples the signal to an FET transistor switch S which is normally closed. The current from a battery B passes through the primary of ignition coil T1 and builds up a magnetic field in its core. Then, when $V_t$ is reached at the output of A1, the FET switch S opens and the collapsing magnetic field produces a voltage in the secondary winding of the ignition coil T that provides the spark at ignition plug P. As the engine speeds up, the ignition takes place at an earlier time as shown by $t_2$ and $t_3$ in FIG. 8. In this way, the desired ignition advance to avoid detonation is obtained.

Figure 9B:
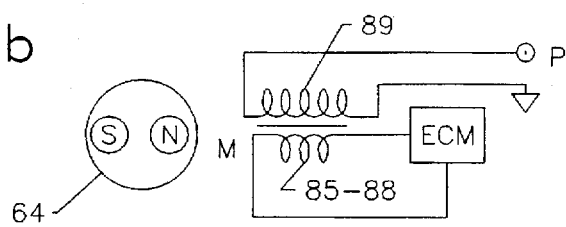

It will be noted that the ignition system described is similar to that employed in small engines with magneto ignition. In fact, it is apparent that if the size of the magnets is increased, and the current handling capacity of the coils of FIG. 7a and the cross section area of the magnetic yoke are also increased, the electromagnetic sensor of FIG. 7a could function as the primary winding of a magneto. It would only be necessary to add a secondary winding as shown by 89 in FIG. 7a in order to provide magneto ignition as shown in FIG. 9b.

The magneto ignition system of FIG. 9b functions in the following way. As the magnets on the rotating housing 64 pass the pole pieces 81, 82, 83, and 84, a current is induced in the primary of the magneto M. The Electronic Ignition Control Module ECM, which is similar to that shown in FIG. 9a, interrupts the current in the primary winding and the collapsing field induces a voltage in the secondary winding which produces a spark at the ignition plug P.

An alternative to the use of magneto ignition would be retain the use of an ignition coil and battery, but to use a second winding, e.g. 90 in FIG. 7a to keep the battery charged. This is shown in FIG. 9a by the current path shown in dashed lines. Diode D in this current path allows current flow through winding 90 only when the voltage induced in winding 90 exceeds the battery voltage. Battery B supplies a net current only when the engine is started—otherwise it is continuously recharged. Hence a small, light weight battery can be used. This is one of the preferred embodiments because it would result in better starting characteristics than magneto ignition. This embodiment also has the potential for lighter weight than a magneto ignition system because magnetos typically must be designed to provide adequate spark when starting and hence are heavier than would be necessary to insure proper ignition at normal engine running speeds.

Figure 9C:
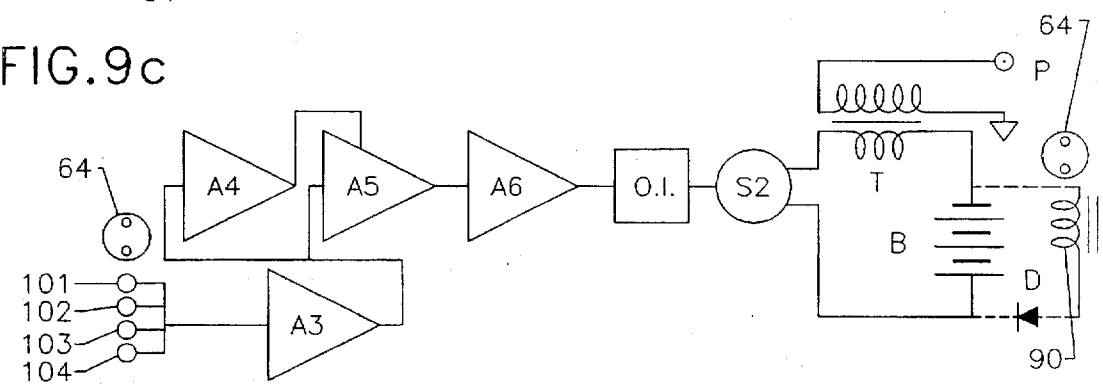

Still another form of electronic ignition is shown in FIG. 9c. In this embodiment, the sensors are position sensitive, but not velocity sensitive, e.g. Hall sensors or optical interrupter sensors. These sensors are indicated schematically by 101, 102, 103, and 104 and would be located at the positions 74, 75, 76, and 77 of FIG. 5. In this case, the engine speed is detected by a ratemeter circuit A4 that receives a conditioned pulse from amplifier A3. The ratemeter output is used to control the gain of amplifier A5 whose output is used via the comparator A6 to trigger the FET switch S2. The transistor switch functions in the same way as the transistor switch S the electronic control module of FIG. 9a.

SUMMARY AND RAMIFICATIONS

The maximum output speed of rotary engines is not usually limited by the action of the valves as is the case for conventional piston engines. Instead, it is limited by the maximum peripheral velocity of the rotors. The subject invention provides a version of reciprocating vane rotary engine that has higher output speeds because of the novel gear transmission system that is used. This gear transmission system not only has fewer parts, it also serves as a basis for the ignition timing of the engine. This provides an engine that is simpler in construction and also lighter weight.

While the above description contains many specifications, these should not be construed as limitations of the scope of the invention but as examples of some of the preferred embodiments. Thus, the scope of the invention should be determined not by the embodiments described but by the appended claims.

I claim:

1. A rotary engine comprising:
   a) two interdigitated rotors rotatably moveable in a cylindrical cavity in an engine housing having a cooling means and inlet and outlet ports, each of said rotors having a hub, and two radial vanes, said vanes of the first of said rotors extending over the hub of the second of said rotors so that a seal is formed between the first said rotor and the second said rotor and between said rotors and said housing, whereby the cylindrical cavity is divided into four compartments,
   b) an output gear drive containing an external gear, an internal gear, and an output shaft having an eccentric portion, said external gear being coaxial with said output shaft and having a fixed angular position relative to said housing, said internal gear meshing with said external gear and being contained in a moveable housing that is constrained to orbit about the axis of said output shaft by said eccentric portion, said moveable housing having at least one crank pin which moves in an epicycloidal path, said crank pin being linked to one of said rotors by a moveable connecting means whereby this said rotor is constrained to move with periodic rotary motion superposed on uniform rotary motion.

2. An engine as described in claim 1 in which the ratio of the pitch diameter of said external gear to the pitch diameter of said internal gear is 3/2.

3. An engine as described in claim 1 wherein each of said rotors contains a circular end plate.

4. An engine as described in claim 1 wherein said engine housing contains two radially directed end walls terminating said cylindrical cavity.

5. An engine as described in claim 1 wherein said moveable housing containing said internal gear has two crank pins and the second of the said rotors contains a rotor shaft rigidly attached to it, said rotor shaft passing through an axial hole in the first rotor and containing a crank that is linked by a moveable coupling means to the second of said crank pins on said moveable housing whereby the second said rotor is constrained to move with periodic rotary motion superposed on uniform rotary motion.

6. An engine as described in claim 1 wherein said moveable housing contains means for interrupting an optical beam and said engine housing contains four sensors that are opto-interrupter sensors.

7. An engine as described in claim 6 wherein said opto-interrupter sensors are mounted on a frame whereby the angular position of said sensors can be adjusted by rotating said frame about the axis of said output shaft.

8. An engine as described in claim 1 wherein said moveable housing contains two permanent magnets, the motion of which induces current in the primary winding of a magneto, said primary winding being wrapped on a yoke of high magnetic permeability which contains pole pieces whose angular orientation about said output shaft can be adjusted by rotating said yoke about the axis of said output shaft.

9. An engine as described in claim 1 wherein said moveable housing contains at least one permanent magnet, the motion of which induces current in a coil, said current being used to charge a battery, and said coil being mounted in a fixed position in said engine housing.

10. A rotary engine comprising:
   a) two interdigitated rotors rotatably moveable in a cylindrical cavity in an engine housing having a cooling means and inlet and outlet ports, each of said rotors having a hub, and two radial vanes, said vanes of the first of said rotors extending over the hub of the second of said rotors so that a seal is formed between the first said rotor and the second said rotor and between said rotors and said housing, whereby the cylindrical cavity is divided into four compartments,
   b) an output gear drive containing an external gear, an internal gear, and an output shaft having an eccentric portion, said external gear being coaxial with said output shaft and having a fixed angular position relative to said housing, said internal gear meshing with said external gear and being contained in a moveable housing that is constrained to orbit about the axis of said output shaft by said eccentric portion, said moveable housing having at least one crank pin which moves in an epicycloidal path, said crank pin being linked to one of said rotors by a moveable connecting means whereby this said rotor is constrained to move with periodic rotary motion superposed on uniform rotary motion,
   c) two permanent magnets contained in said moveable housing and four sensors contained in said engine housing which detect the passing of said magnets over said sensors for the purpose of ignition timing.

11. An engine as described in claim 10 in which the ratio of the pitch diameter of said external gear to the pitch diameter of said internal gear is 3/2.

12. An engine as described in claim 10 wherein each of said rotors contains a circular end plate.

13. An engine as described in claim 10 wherein said engine housing contains two radially directed end walls terminating said cylindrical cavity.

14. An engine as described in claim 10 wherein said moveable housing containing said internal gear has two crank pins and the second of the said rotors contains a rotor shaft rigidly attached to it, said rotor shaft passing through an axial hole in the first said rotor and containing a crank that is linked by a moveable coupling means to the second of said crank pins on said moveable housing whereby the second said rotor is constrained to move with periodic rotary motion superposed on uniform rotary motion.

15. An engine as described in claim 10 wherein said sensors consist of one or more coils wound on a core of high magnetic permeability.

16. An engine as described in claim 15 wherein said coils are at least two in number and are connected so that the voltage induced by said permanent magnets in said coils is additive.

17. An engine as described in claim 16 wherein said core of high permeability contains pole pieces to enhance the magnetic field induced in said coils by said magnets.

18. An engine as described in claim 17 wherein the angular position of said pole pieces relative to the axis of said output shaft can be adjusted for the purpose of setting the engine timing.

19. An engine as described in claim 10 wherein said sensors are Hall effect sensors.

20. An engine as described in claim 19 wherein said Hall sensors are mounted on a frame whereby the angular position of said sensors can be adjusted by rotating said frame about the axis of said output shaft.

* * * * *